Nov. 10, 1959     B. L. BINFORD     2,911,830
VISCOUS FLUID LEVEL MEASURING DEVICE
Filed July 18, 1955
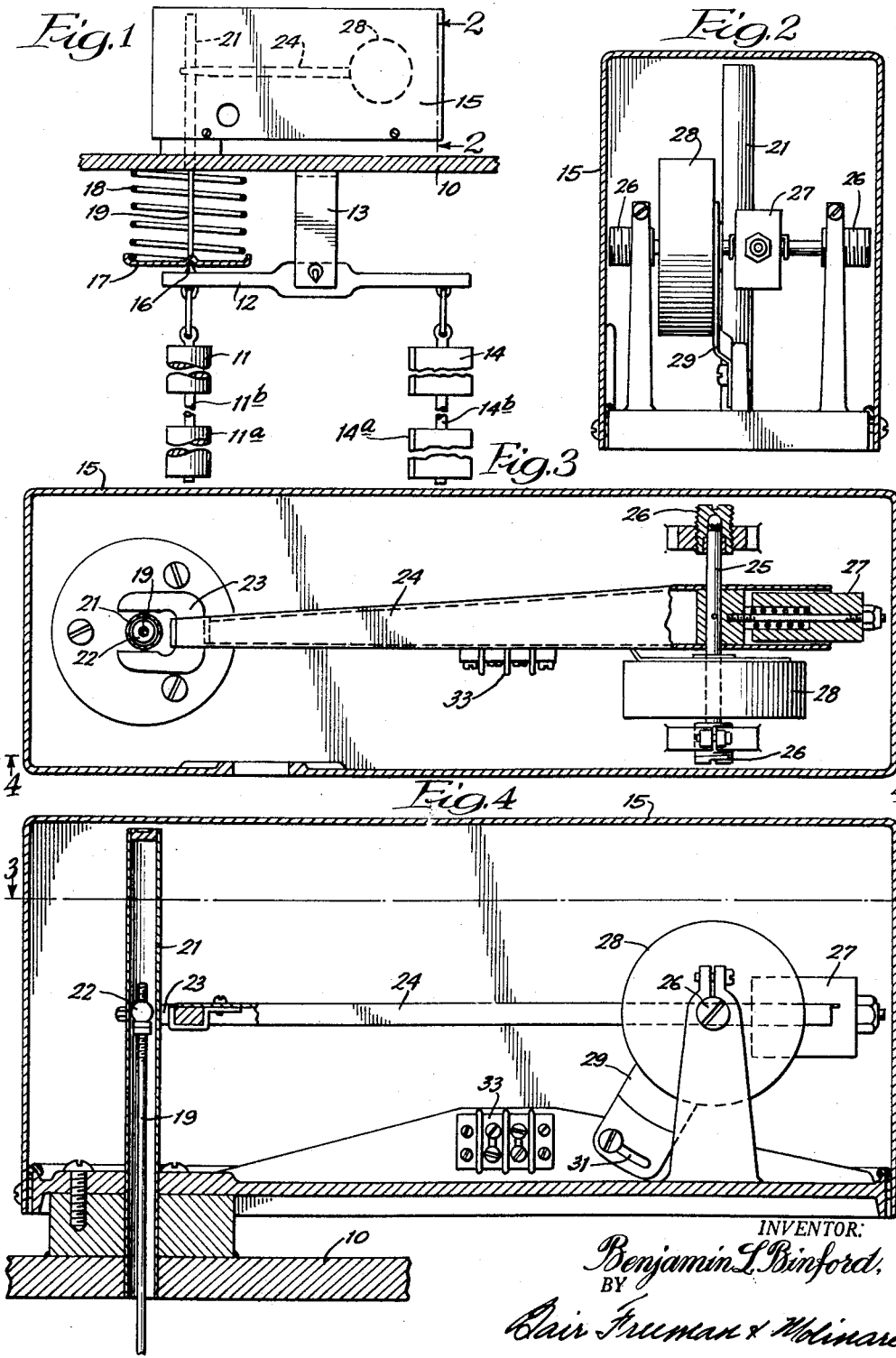
INVENTOR:
Benjamin L. Binford,
BY
Blair, Freeman & Molinare
ATTORNEYS.

United States Patent Office 2,911,830
Patented Nov. 10, 1959

2,911,830

VISCOUS FLUID LEVEL MEASURING DEVICE

Benjamin L. Binford, Elmwood Park, Ill., assignor to Magnetrol, Inc., Chicago, Ill., a corporation of Illinois Application July 18, 1955, Serial No. 522,476

10 Claims. (Cl. 73—309)

This invention relates to a viscous fluid measuring device and more particularly to an apparatus for measuring changes of level of viscous fluids.

In measuring viscous fluids with a conventional float or displacer accuracy cannot be maintained due to build-up of material on the float or displacer. This action occurs with many types of materials, such as molasses, chemicals of various types, sewage, and the like, which produce deposits on a float or displacer and for purposes of the present invention, all such materials are considered to be viscous.

It is one of the objects of the present invention to provide a viscous fluid measuring device in which the effect of build-up on the float or displacer is fully compensated so that accuracy may be maintained over a long period of time.

Another object is to provide a measuring device in which the displacer is counterbalanced by a counterweight and the areas of the counterweight and displacer exposed to the viscous fluid are in the same ratio as their mechanical leverages on the indicating mechanism. In the preferred construction, the areas are equal and are supported by a pivoted beam at equi-distance from its pivot. With this construction, the material build-up will be equal or proportional on the displacer and counterweight so that the effects of the build-up will cancel and accuracy can be maintained.

A further object is to provide a measuring device in which movement of a displacer due to level changes causes pivotal movement of a lever which is connected directly through its pivot to an indicating device.

According to one feature, the indicating device comprises two relatively rotatable parts, one of which is secured directly to the pivot shaft of the lever to mount the device and the other of which can be secured adjustably against rotation thereby to set the device.

The above and other objects and features of the invention will be more readily apparent from the following description when read in connection with the accompanying drawing, in which:

Figure 1 is a diagrammatic view of a measuring device embodying the invention;

Figure 2 is an enlarged partial section on the line 2—2 of Figure 1;

Figure 3 is a horizontal section through the indicating device on the line 3—3 of Figure 4; and Figure 4 is a vertical section through the indicating device on the line 4—4 of Figure 3.

The measuring device, as shown in Figure 1, is adapted to indicate the level of a viscous fluid in a tank, a portion of whose top wall is indicated at 10. Changes in the level of fluid in the tank are sensed by a displacer 11 which is so designed as to have a relatively large ratio of volume to surface area. For example, one very satisfactory shape for the displacer is cylindrical which provides a high ratio of volume to surface area. The displacer 11 is suspended from one end of a balance beam 12 pivoted at its center on a bracket 13 carried by the tank top. The opposite end of the beam 12 carries a counterweight 14 whose surface area times its lever arm from the pivotal axis of the beam is equal to the surface area of the displacer 11 times its lever arm from the pivotal axis of the beam. In other words, the mechanical advantage between the displacer and the lever is in the same ratio to the mechanical advantage between the counterweight and the lever as the surface area of the counterweight bears to the surface area of the displacer and the mechanical advantage between the displacer and counterweight through the lever is inverse to the ratio their areas bear to each other. In the preferred construction, as shown, the counterweight and displacer are equi-distant from the beam pivot and have the same surface area. The counterweight, however, is shaped to provide the least possible volume and in the form shown is a flat rectangular strip whose surface area is the same as the displacer but whose volume is substantially less.

With this construction, as the liquid level changes, the displacer will move with it and may be connected to an indicating device to indicate the level changes. Since the same area of displacer and counterweight is exposed to the liquid any build-up on one will be equal to the build-up on the other so that their relative volumes and relative weights remain the same. Therefore, accuracy of measurement will be maintained over a substantial period of time and it will be unnecessary to clean the displacer with a high degree of frequency.

The displacer and counterweight may be single units but, as shown, are preferably formed in two vertically spaced connected sections to achieve a wide control range in the manner more particularly described and claimed in my Patent No. 2,576,561. For this purpose the displacer comprises an upper section 11, and a lower section 11a, adjustably supported in vertically spaced relationship on a small diameter rod 11b, the rod 11b is connected to one end of the beam 12 as shown. The counterweight is similarly formed with an upper section 14 and a lower section 14a adjustably supported on a rod 14b identical to the rod 11b and connected to the opposite end of the beam 12.

The upper and lower sections of the counterweight and displacer are spaced apart the required distance to produce the desired width of control range and are then secured to the respective rods 11b and 14b. It will be understood that the sections 11 and 14 are at the same level and the sections 11a and 14a are at the same level.

Movement of the displacer is transmitted to an indicating or measuring instrument which, as shown, may be enclosed in a casing 15 above the tank top 10. In the construction shown, the counterweight 14 is so proportioned relative to the displacer 11 that the displacer tends to rise in response to level increases and will fall when the level falls. The beam 12 above the displacer carries a relatively narrow projection 16 which engages a spring follower 17 urged downward by a compression spring 18. The buoyant effect of the displacer is sufficient to compress the spring 18 and move the follower 17 upward when the level rises.

The follower 17 has secured thereto an operating rod 19 whose upper end extends up into a closed tube 21 of non-magnetic material, such as brass, as shown in Figure 4. The tube opens through the tank wall 10, but is sealed at its upper end so that pressure can be maintained in the tank. The rod 19 carries a magnetic armature 22 in the tube which will be moved vertically in the tube as the level changes.

According to the present invention, changes of level are to be indicated electrically through a bridge circuit, or the like, and movement of the armature 22 is utilized to adjust one element of the bridge circuit. As shown, the armature 22 will be followed in its movement by a U-shaped magnet 23 carried by one end of a lever 24. The lever is secured to a pivot shaft 25 supported in bearings 26 so that the end thereof which carries the magnet 23 can move up and down with the armature 22. Preferably, a counterweight 27 is provided to balance the lever so that it can turn freely with the armature 22.

The lever is adapted to adjust a potentiometer, including a cylindrical casing 28 in which the slide wire may be housed and an internal wiper rotatable relative to the housing to move over the slide wire. Potentiometers of this type are well known in the art and are standard articles of commerce so that no further description will be required.

In mounting the potentiometer, the center rotating element is mounted directly on the pivot shaft 25 so that the potentiometer is directly supported by the pivot shaft. The outer case of the potentiometer carries an extension arm 29 formed with an arcuate slot 31 to be engaged by a screw 32 to hold the casing of the potentiometer in any desired position of adjustment. By loosening the screw 22 and swinging the potentiometer casing through the arm 29 the indicating mechanism of the present invention can be adjusted so that it will correctly indicate the liquid level. Leads from the potentiometer may be brought out to a terminal strip 33 in the casing and the potentiometer may be connected into the desired bridge circuit through external leads brought into the terminal strip 33.

While one embodiment of the invention has been shown and described in detail, it will be understood that this is illustrative only and is not to be taken as a definition of the scope of the invention, reference being had for this purpose to the appended claims.

What is claimed is:

1. A viscous fluid measuring device comprising a displacer adapted to be submerged in a fluid whose level is to be measured and having a large volume-surface area ratio, a counterweight adapted to be submerged in the liquid and having a smaller volume-surface area ratio, means connecting the displacer and counterweight to counterbalance each other and for simultaneous movement in response to changes in level of the liquid, said means establishing a mechanical advantage between the displacer and counterweight which is inverse to the ratio their surface areas bear to each other, and indicating means operatively connected to the displacer to sense movements thereof.

2. A viscous fluid measuring device comprising a displacer adapted to be submerged in a fluid whose level is to be measured and having a large volume-surface area ratio, a counterweight adapted to be submerged in the liquid and having a smaller volume-surface area ratio, a beam pivoted on a horizontal pivot and having the displacer and the counterweight suspended from opposite sides of its pivot, the lever arms from the beam pivot to the displacer and counterweight being in a ratio which is inverse to the ratio their surface areas bear to each other, and indicating means connected to the beam to sense movements thereof.

3. A viscous fluid measuring device comprising a displacer adapted to be submerged in a fluid whose level is to be measured and having a large volume-surface area ratio, a counterweight adapted to be submerged in the liquid and having a smaller volume-surface area ratio, a beam pivoted on a horizontal pivot and having the displacer and the counterweight suspended from opposite sides of its pivot, the lever arms from the beam pivot to the displacer and counterweight being in a ratio which is inverse to the ratio their surface areas bear to each other, a spring resiliently urging the beam to tilt in one direction about its pivot, and indicating means operatively connected to the beam to sense movements thereof.

4. A viscous fluid measuring device comprising a displacer adapted to be submerged in a fluid whose level is to be measured and shaped to provide a large volume-surface area ratio, a counterweight adapted to be submerged in the fluid to substantially the same level as the displacer and shaped to provide a smaller volume-surface area ratio, the displacer and counterweight having equal surface areas, a beam pivoted at its center on a horizontal axis and connected at its ends to the displacer and counterweight respectively, and means to sense pivotal movement of the beam.

5. A viscous fluid measuring device comprising a displacer adapted to be submerged in a fluid whose level is to be measured and shaped to provide a large volume-surface area ratio, a counterweight adapted to be submerged in the fluid to substantially the same level as the displacer and shaped to provide a smaller volume-surface area ratio, the displacer and counterweight having equal surface areas, a beam pivoted at its center on a horizontal axis and connected at its ends to the displacer and counterweight respectively, a spring urging the beam in one direction, and means to sense movement of the beam.

6. A viscous fluid measuring device comprising a displacer adapted to be submerged in a fluid whose level is to be measured and shaped to provide a large volume-surface area ratio, a counterweight adapted to be submerged in the fluid to substantially the same level as the displacer and shaped to provide a smaller volume-surface area ratio, the displacer and counterweight having equal surface areas, a beam pivoted at its center on a horizontal axis and connected at its ends to the displacer and counterweight respectively, a lever above the beam pivotally mounted on a horizontal axis, means operatively connecting the lever to the beam to be moved thereby as the beam moves, and an adjustable indicating element connected to the lever to be adjusted by movement of the lever.

7. A viscous fluid measuring device comprising a displacer adapted to be submerged in a fluid whose level is to be measured and shaped to provide a large volume-surface area ratio, a counterweight adapted to be submerged in the fluid and shaped to provide a smaller volume-surface area ratio, the displacer and counterweight having equal surface areas, a beam pivoted at its center on a horizontal axis and connected at its ends to the displacer and counterweight respectively, a vertically extending tube of non-magnetic material mounted above the beam, a magnetic element in the tube connected to the beam to be moved thereby, a lever pivoted on a horizontal axis with one end lying adjacent to the tube, a magnetic element carried by said one end of the lever to be moved by the first named magnetic element as it moves in the tube, and an adjustable indicating element connected to the lever to be adjusted by movement of the lever.

8. A viscous fluid measuring device comprising a displacer adapted to be submerged in a fluid whose level is to be measured and shaped to provide a large volume-surface area ratio, a counterweight adapted to be submerged in the fluid and shaped to provide a smaller volume-surface area ratio, the displacer and counterweight having equal surface areas, a beam pivoted at its center on a horizontal axis and connected at its ends to the displacer and counterweight respectively, a vertically extending tube of non-magnetic material mounted above the beam, a magnetic element in the tube connected to the beam to be moved thereby, a lever pivoted on a horizontal axis with one end lying adjacent to the tube, a magnetic element carried by said one end of the lever to be moved by the first named magnetic element as it moves, an adjustable indicating device including relatively rotatable parts the inner of which is secured to the pivot of the lever to mount the indicating device, and adjustable means to hold the outer of the relatively rotatable parts against rotation.

9. A viscous fluid measuring device comprising a balance member, a pair of vertically spaced displacer sections connected to the balance member to urge it in one direction, the displacer sections adapted to be submerged in a liquid whose level is to be measured and having a large volume-surface area ratio, a pair of vertically spaced counterweight sections connected to the balance member to urge it in the other direction, the counterweight sections adapted to be submerged in the liquid to substantially the same level as the displacer sections and having a relatively small volume-surface area ratio, the displacer sections and counterweight sections being connected to the balance member through lever arms which are inversely proportional to the surface areas of the displacer and counterweight sections, and indicating means operatively connected to the balance member.

10. A viscous fluid measuring device comprising a balance beam pivoted at its center on a horizontal axis, a pair of vertically spaced displacer sections connected to one end of the beam and having a large volume-surface area ratio, a pair of vertically spaced counterweight sections connected to the other end of the beam and having the same surface area as the displacer sections respectively but being of smaller volume, the lever arms of the displacer sections and the counterweight sections on the beam being equal, and indicating means operatively connected to the beam.

References Cited in the file of this patent

UNITED STATES PATENTS

| | | |
|---|---|---|
| 44,118 | Smith | Sept. 6, 1864 |
| 988,342 | Hillmer | Apr. 4, 1911 |
| 1,864,991 | Eynon | June 28, 1932 |
| 2,038,273 | Eynon | Apr. 21, 1936 |
| 2,323,166 | Urfer | June 29, 1943 |

FOREIGN PATENTS

| | | |
|---|---|---|
| 608,477 | France | Apr. 23, 1926 |
| 130,758 | Germany | Dec. 31, 1928 |
| 702,984 | France | Feb. 2, 1931 |